United States Patent [19]

Kafri

[11] Patent Number: 5,299,024
[45] Date of Patent: Mar. 29, 1994

[54] METHOD AND APPARATUS FOR BROADCASTING AND RECEIVING BROADCASTED INFORMATION

[75] Inventor: Oded Kafri, Beer-Sheva, Israel
[73] Assignee: Constanza 330 Ltd., Beer Sheva, Israel
[21] Appl. No.: 853,802
[22] Filed: Mar. 19, 1992
[51] Int. Cl.⁵ .......................................... H04M 1/40
[52] U.S. Cl. .................... 358/400; 358/434; 358/442; 379/100
[58] Field of Search ............ 358/442, 407, 434, 405, 358/435, 436, 437, 438, 439; 379/100, 31, 77; 455/3.2, 24, 69

[56] References Cited

U.S. PATENT DOCUMENTS

| | | | |
|---|---|---|---|
| 4,809,297 | 10/1984 | Polansky et al. | 455/73 |
| 4,837,812 | 6/1989 | Takahashi et al. | 379/100 |
| 4,881,129 | 11/1989 | Mitsuhashi | 455/258 |
| 4,977,609 | 12/1990 | McClure | 358/442 |
| 5,121,391 | 6/1992 | Paneth et al. | 455/33.1 |
| 5,152,003 | 9/1992 | Poch | 455/33.1 |
| 5,237,429 | 8/1993 | Zuiss et al. | 358/437 |

OTHER PUBLICATIONS

McConnell, Kenneth R., Dennis Bodson, and Richard Schaphorst, FAX: Digital Facsimile Technology and Applications: Norwood, MA: Artech House, Inc., 1992, 2nd edition, pp. 37 and 40-41.

Primary Examiner—Edward L. Coles, Sr.
Assistant Examiner—Jerome Grant, II
Attorney, Agent, or Firm—Merchant, Gould, Smith, Edell, Welter & Schmidt

[57] ABSTRACT

A system for broadcasting and receiving broadcasted information. A first fax or modem is connected through a transmitter interface to a radio transmitter. A second fax or modem is connected through a receiver interface to a radio receiver. Information to be broadcast is encoded by the first fax or modem, transmitted through the transmitter interface and broadcasted. One or more receivers capture the broadcasted information and transmit the captured information through their respective receiver interfaces to their respective second fax machines where the information is decoded and recorded.

15 Claims, 2 Drawing Sheets

METHOD AND APPARATUS FOR BROADCASTING AND RECEIVING BROADCASTED INFORMATION

FIELD OF THE INVENTION

This invention relates to a method and apparatus for transmitting information via radio, and more specifically, for transmitting information from a radio broadcasting station and a plurality of fax or modem receiving apparatus. The invention permits to provide in a regular automatic manner information regarding chosen subjects to subscribers who have contracted to receive such information.

BACKGROUND OF THE INVENTION

Information transmission by telecopier or by telefax or fax machine has developed to a great extent and has acquired considerable importance. However, such transmission, as far as the art is concerned, is confined to bilateral communication between a sending fax machine and a receiving fax machine and does not permit concurrent transmission to a large or to an unlimited number of addresses. On the other hand, transmission broadcasts by radio can be received by anyone having a radio receiver, but whoever is interested in a given item of information must be listening to his radio receiver at the moment that the information is being transmitted. The same thing is true if the information is transmitted by television: it can only be received by a person who is watching his own television receiver at the moment that the information is being transmitted. It should be understood that whenever the reference is being made to a radio, transmission by television is also included, and in that case the audio circuits of the television receiver will play the part which the radio receiver plays in the following description of the invention. Furthermore, there is a way in which a radio or television broadcasting station may selectively transmit different items of information to different addresses, and remunerated for this service.

It is a purpose of the invention to provide a method and apparatus which will permit a radio or television broadcasting station to broadcast selected items of information, according to predetermined subjects, to subscribers who have contracted to receive information relating to a given subject, and to record the transmitted information in printed form, without the need or the presence of any listener or viewer or operator.

It is another purpose of the invention to achieve the aforementioned purpose by using standard transmitting, receiving and fax apparatus, or modem, with the addition of suitable components, as will be hereinafter explained.

Basically, fax and modem communications are similar. Fax apparatus is more popular because it is more convenient to operate and it sends graphic information. However, this invention can be carried out basically by the same means by means of fax or modem apparatus. Therefore it should be understood that, whenever the word "fax" is used hereinafter in this specification and claims, it means "fax or modem".

It is a further purpose of the invention to provide a method and apparatus whereby a broadcaster may enter into contractual agreements for the transmission to specific subscribers of information relating to pre-selected subjects and be remunerated for this service, or, alternatively, be remunerated through the supply of apparatus for the reception of the broadcasted information.

Other purposes and advantages of the invention will be understood as the description proceeds.

SUMMARY OF THE INVENTION

The invention's purposes are achieved by the method according to the invention which comprises, in combination with the production of fax or modem signals, viz. pulses such as are currently transmitted and received by fax or modem apparatus;

1—broadcasting said fax signals through a radio transmitter in any convenient frequency band;
2—broadcasting a ring code at the beginning of each transmission and before transmitting the body of the information, and, preferably, an end code at the end of each such transmission;
3—receiving said broadcasted signals and codes by means of a radio receiver;
4—providing fax or modem receiver means operationally connected to said radio receiver;
5—transmitting said ring code to said fax or modem receiver, whereby to activate the same, and preferably, transmitting said end code to said fax or modem receiver whereby to de-activate the same;
6—carrying out a self-handshake or off-line handshake procedure involving said fax or modem receiver, wherein said fax or modem receiver sends out the signals that it would normally send out in an on-line handshake at the beginning of a conventional fax or modem transmission and receives the signals that it would normally receive in an on-line handshake at the beginning of a conventional fax or modem transmission, though there is no phone line and no fax sender directly and bilaterally connected with it;
7—thereafter, conveying the fax or modem signals received by the radio receiver to the fax or modem receiver; and
8—preferably printing the message conveyed by the received signals.

The broadcasted and received fax (or modem—this alternative will remain implicit from now on) signals are preferably converted by the radio receiver or like apparatus to audio signals. These are monitored to determine whether they represent a ring or end code or are part of the broadcasted message, and the fax receiver is caused to carry out the operation appropriate to each case—activation, self-handshake, receiving and printing, de-activation. However, it would not involve a departure from the invention to employ a fax receiver that is permanently activated or a special fax receiver which does not need to carry out a handshake at the beginning of an operation. If the fax signals to be broadcasted are produced by a standard fax machine, this latter is structured to carry out an on-line handshake, viz. a bilateral exchange of signals, with a fax sender, in order properly to operate. According to the invention, therefore, it will operate like the receiving fax, viz. will carry out an off-line handshake or a self-handshake. However, it does not involve a departure from the invention to produce the fax signals to be broadcasted in any other, suitable manner.

The ring code may be selective, e.g. different for each type of broadcasting or for each type of information broadcasted, or, alternatively, a selection code may be sent before or after the ring code and the fax receiver will be activated only if the selection code corresponds to the broadcast or the information which said fax receiver is intended to receive and print.

An apparatus according to the invention comprises a radio receiver, a telefax machine, and an interface for monitoring the broadcasted and received signals and controlling the fax receiver's operation accordingly. Preferably, said interface comprises control means for: a) monitoring the signals conveyed by the radio receiver; b) if said signals constitute a predetermined ring code, activating the fax receiver; c) once the fax receiver has been activated, causing it to send out the appropriate handshake signals and conveying to it the appropriate handshake responses (viz. the signals that would normally be sent by the fax sender), whereby to carry out a self-handshake; d) once the self-handshake has been completed, transmitting the fax message to the fax receiver for the same to print out. Preferably, the control means also de-activate the fax receiver, once they recognize that an end code has been broadcasted. Preferably, the control means are constituted by computer means, in general a micro-computer, which may be single-chip.

The combination of the fax producing and broadcasting means is also a part of the apparatus according to the invention.

DESCRIPTION OF THE DRAWINGS

The invention will be better understood with reference to the attached drawings, wherein.

DETAILED DESCRIPTION OF PREFERRED EMBODIMENTS

Figure 1:
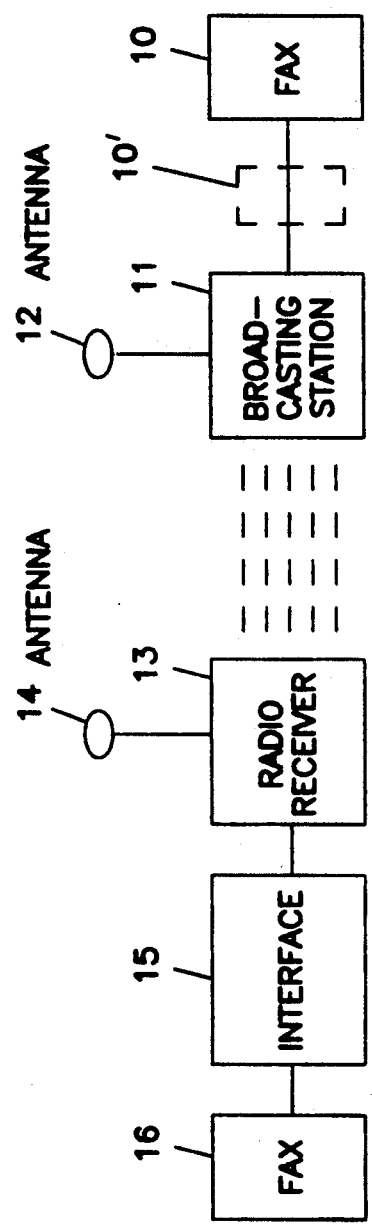
FIG. 1 is a schematic block diagram illustrating the operation of the invention.

FIG. 1 illustrates in block diagram form an embodiment of the invention, for the case in which the information is broadcasted by a radio broadcasting station and received by a radio receiver. As stated hereinbefore, transmission and reception by television are carried out in substantially the same way. Radio and television broadcasting can be carried out over very large frequency bands, which leaves sufficient space for the transmissions considered by the present invention, without interfering with normal broadcasting.

The information to be broadcasted is preferably fed to a fax which transforms it into digital impulses which are substantially the same as are produced in normal fax communication for transmission through a telephone line. It is understood that it will not involve a departure from the invention to produce those signals in a way different from the use of a standard fax machine. If a standard fax machine is employed, an interface 10' is necessary, as will be explained hereinafter, and this is shown in the block diagram of FIG. 1 in broken lines, as a special fax transmitting machine could be made for carrying out the invention, which would not require such an interface. However, it is more convenient and economical to use standard fax machines, whenever possible.

The signals pass from interface 10' to the broadcasting station 11, which broadcasts them through antenna 12. They are received through antenna 14 by radio receiver 13. It should be understood that each addressee of the information, or subscriber to the service for which the invention is intended, will have his own receiver, so that in fact the number of radio receivers 13 will be very large, and theoretically is unlimited. The radio receiver transforms the fax signals received into acoustic signals which are fed to an interface 15, which cooperates with a receiving fax 16, in the manner which will be hereinafter described, to permit said fax to operate and print the information received.

Figure 2:
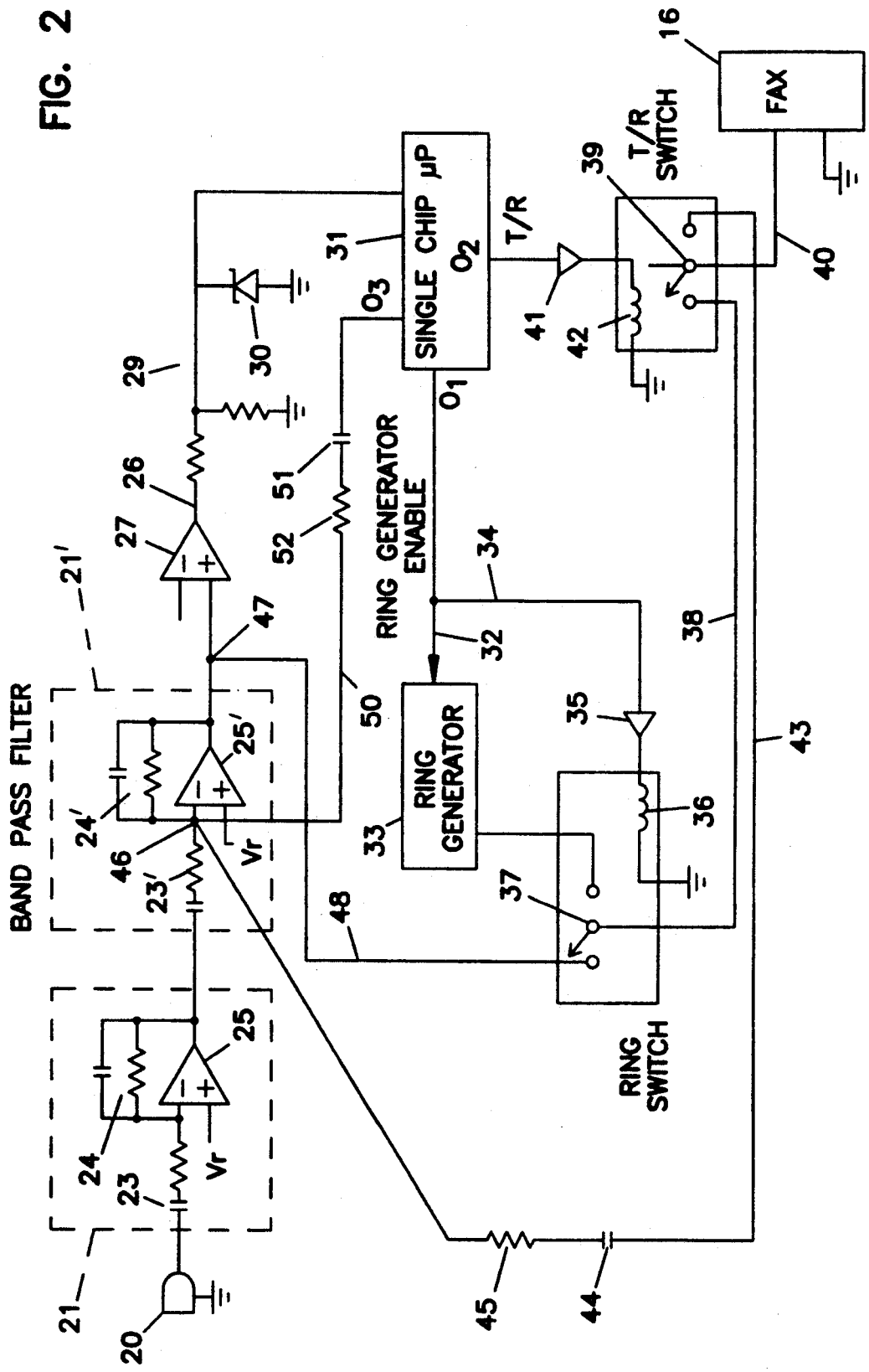
FIG. 2 is a diagrammatic representation of circuital means, particularly the interface, according to an embodiment of the invention.

The interface is illustrated in detail in FIG. 2. The acoustic signals from the radio receiver (this latter not shown in FIG. 2) are sensed by microphone 20, which transforms them into electrical signals. These pass through an active band pass filter or preferably two such filters 21 and 21' in series, as shown in the drawing, each comprising a high pass filter 23—23', a low pass filter 24—24' and an operational amplifier 25—25' the open log of which is connected to a reference voltage $V_r$. From said filters, the signals pass to line 26, successively through a zero cross detector or comparator 27, which transforms them to a series of pulses viz. to a square wave, and through a TTL level adaptor 29, comprising a Zener diode 30, which limits the tension of the pulses to at most 5.1 volts, and are finally fed to the input port $I_1$ of a control circuit, which is embodied, e.g., by a single chip microcomputer, generally indicated at 31, as in the example described, or by another electronic device capable of performing the operations hereinafter described.

The microcircuit 31, or like electronic component, monitors and analyzes the signals it receives. When the broadcasting station 11 wishes to transmit information to be received according to the invention, it transmits first of all a ring code, of any suitable composition, desirably so devised that there be practically no likelihood that such a ring code be sent accidentally as part of a normal radio transmission. If the control circuit 31 recognizes that the signal received is indeed a ring code, it transmits a ring generator enabling signal through output port $O_1$ through line 32 to a ring generator 33 and through line 34 and buffer 35 to a relay 36 which controls switch 37. The ring generator 33, when thus enabled, generates a ring, viz. a signal that is substantially identical to the signal which is normally received by a fax receiver through a telephone line when a fax transmitter wishes to start transmitting to it, viz. substantially a phone ring. Such rings are generally 100 V, 20 Hz signals. The relay 36 has been energized and has swung switch 37 from its normal position, indicated by the arrow in the drawing, to its alternate (right-hand in the drawing) position. Then the ring signal generated at 33 passes through the switch to a line 38 and to a T/R switch 39, which is normally in the position indicated by the arrow in the drawing, and through switch 39 and line 40 reaches the fax 16 and activates it as it would activate if it were sent by a fax sender through a phone line to initiate a normal fax transmission.

At this point, if the fax is a standard fax apparatus, it should carry out a handshake with the sending fax apparatus in order to be able to receive and print the message. In the case of the invention, this is obviously impossible, since there is no direct connection between the addressees' faxes and the fax 10 at the broadcasting station 11, if in fact there is such a fax and the signals carrying the information are not produced in a different manner. Therefore what may be called a self-handshake is carried out through a series of operations controlled by control circuit 31.

Control circuit 31 activates, through outlet $O_2$ and buffer 41, a relay 42, which brings the switch 39 to its alternate (right-hand in the drawing) position. The fax 16 transmits signals, which are the normal ones that it would transmit, as receiving fax, to carry out a standard handshake with a sending fax connected to it through a telephone line. These signals pass through line 40 and switch 39, to line 43 and through a DC block 44 and resistance 45, to a node 46 through which it is connected to line 26. As soon as the ring has terminated, control circuit 31 has de-energized relay 36 and therefore switch 37 has returned to its normal position. The handshake signal sent by fax 16 is received through line 26 by control circuit 31. This latter recognizes it for what it is, and responds by de-energizing relay 42 through port $O_2$ and thus returning switch 39 to its normal position and by producing a return handshake signal, such as would be sent in normal fax communication by the sending fax. The return handshake signal is outputted through output port $O_3$ to line 50, passes through DC block 51 and resistance 52, and reaches node 46. From node 46 it reaches node 47, and from this latter passes to line 48, switch 37, line 38, switch 39, line 40 and fax 16. The procedure described above can be repeated any number of times and any number of handshake signals may be sent and received by fax 16. In this manner a complete handshake procedure is carried out between fax 16 and control circuit 31, and the fax becomes ready to receive and print any message in its normal operational way.

Once control circuit 31 recognizes that the self-handshake procedure has been completed, it allows switches 37 and 39 to remain in their normal position. The broadcasting of the message information now begins. The audio signals, after having passed from the microphone 20 through the active band pass filter(s) 21—(21'), pass through line 48, switch 37, line 38, switch 39 and line 40, to fax 16, which prints the message. The same signals are received by control circuit 31, which continues to monitor the transmission (but does not convey any signals to the fax because switch 37 is in its normal position) until it receives an end code, at which time it sends an end of fax signal through outlet $O_3$.

During the transmission of the fax, additional handshake operations are carried out, as is normally done in bilateral fax transmissions through telephone lines, e.g. when a page is finished and another one has to be started, which require no description as they are per se conventional in the fax art. It should be understood that, when references to a handshake or self-handshake in this specification and claims, all these operations are included therein.

A radio station carrying out the invention will generally broadcast different types of information, which interest different individuals or sections of the public, such as e.g. financial news, weather and/or road condition reports, shipping news, news of local interest, etc.. Each individual interested in such information will be a subscriber to the reception of one or more, but seldom all of said types thereof. It is therefore desirable that only the information subscribed for should be received by each subscriber. For this purpose, each broadcast relating to a given type of information may be preceded by a different ring code, and in that case, each subscriber will be provided with an interface comprising a control circuit 31 that is programmed for the ring code or codes corresponding to the broadcasts containing the type of information subscribed for, and will produce a ring enabling signal and activate the fax receiver only when said code or one of said codes has been received. Alternatively, the ring code may be the same for all broadcasts, but it may be preceded or followed by a selection code that will identify the type of broadcast (or both codes may be broadcasted concurrently), and the control device 31 will produce a ring enabling signal only when the ring code and the appropriate selection code have been received.

This will facilitate the collection of subscribers' dues by the station or operating organization. The program, which determines what ring code (if there are different ring codes) or what selection code or what combination thereof will be recognized by the control circuit and will activate the fax, may be stored in a chip or smart card or the like, which may be called "selector" and which will be inserted in the apparatus interface. The subscriber dues may be collected in exchange for the chip or card. Ring codes and/or selection codes or combinations thereof may be changed by the broadcasting station periodically, e.g. annually, whereby the purchase of a new selector, involving the payment of the appropriate dues, will be required.

A preferred embodiment of the invention has been illustrated and other preferred embodiments have been described, but the invention is not limited thereto nor to the specifically mentioned alternatives, and can be carried into practice by skilled persons with many modifications, variations and adaptations, and by the use of means equivalent to those mentioned or capable of performing equivalent tasks.

I claim:

1. Apparatus for receiving broadcasted information, which comprises a radio receiver, a fax or modem receiver, and an interface between said radio receiver and said fax or modem receiver, said interface comprising control means for monitoring and analyzing the signals conveyed by the radio receiver to said interface, for activating the fax or modem receiver if said signals constitute a predetermined ring code, for causing the fax or modem receiver to produce call machine handshake signals normally produced by said fax or modem when acting as a called machine, for intercepting said call machine handshake signals without broadcasting them, for producing, in response to said intercepted signals, response handshake signals normally produced by a calling machine, for feeding the response handshake signals to the fax or modem receiver, whereby to carry out a self-handshake procedure; and for transmitting the broadcasted information.

2. Apparatus according to claim 1, wherein the control means comprise means for deactivating the fax or modem receiver, once said control means recognize that an end code has been broadcasted.

3. Apparatus according to claim 1, wherein the control means comprise computer means for controlling said fax or modem receiver.

4. Apparatus according to claim 1, wherein the control means are programmable to recognize one or more ring codes.

5. Apparatus according to claim 1, wherein the control means are programmable to activate the fax or modem receiver only in response to a predetermined selection code.

6. Apparatus according to claim 5, wherein the control means comprise an interchangeable selector which determines the selection which will cause the control means to activate the fax or modem receiver.

7. Method of broadcasting and receiving information by fax, wherein the method comprises the steps of:
1) providing a first fax having transmitting means for transmitting the information via a fax signal;
2) providing a second fax having receiving means for receiving the information transmitted by the transmitting means;
3) broadcasting, from the first fax, a ring code;
4) receiving, at the second fax, the ring code, wherein the step of receiving the ring code comprises initiating the second fax to receive the fax signal;
5) broadcasting, at the first fax, the fax signal, wherein the step of broadcasting the fax signal comprises:
 transmitting a first signal used to establish communication with a receiving fax; and
 transmitting a fax signal representative of the information;
6) receiving, at the second fax, said broadcasted fax signal, wherein the step of receiving the fax signal comprises:
 receiving, from the first fax, the first signal;
 creating, in response to said first signal, a response signal;
 suppressing transmission of said response signal;
 creating a simulated transmission signal representative of a handshaking response received from a transmitting fax responding to said response signal, said simulated transmission signal serving as a self-handshake at the second fax;
 decoding the information contained in the fax signal broadcast by the first fax; and
 recording the information.

8. The method according to claim 7 wherein the step of recording the information comprises printing the information.

9. The method according to claim 7 wherein the step of broadcasting further comprises sending an end code to terminate the transmission and wherein the step of receiving the fax signal further comprises detecting the end code and deactivating the second fax in response to receiving said end code.

10. The method according to claim 7 wherein the step of broadcasting a ring code comprises selecting a ring code from a plurality of ring codes, wherein the plurality of ring codes include ring codes associated with particular receiving faxes; and
 wherein the step of receiving the ring code comprises comparing the received ring code to ring codes associated with the second fax and initiating the second fax to receive the fax signal only when there is a ring code match.

11. The method according to claim 7 wherein the step of broadcasting a ring code further comprises broadcasting a selection code from a plurality of selection codes, wherein the selection codes are associated with particular receiving faxes; and
 wherein the step of initiating the second fax comprises comparing the received selection code to selection codes associated with the second fax and initiating the second fax to receive the fax signal only when there is a selection code match.

12. The method according to claim 7 wherein the step of broadcasting further comprises creating a simulated response signal representative of a response received from the receiving fax, said simulated response signal serving as a self-handshake at the first fax.

13. Method of receiving broadcasted signals, comprising fax or modem signals, which comprises the steps of:
 receiving said broadcasted signals by means of a radio receiver;
 providing fax or modem receiver means operationally connected to said radio receiver;
 monitoring and analyzing said broadcasted signals whereby to recognize whether they comprise a ring code;
 when said ring code has been recognized, activating said fax or modem receiver;
 calling said fax or modem receiver to produce the handshake signals normally produced by it when acting as a called machine;
 intercepting said called machine handshake signals without broadcasting them;
 producing, in response to the intercepted signals, the response handshake signals that would normally be produced by the calling machine;
 backfeeding them to the fax or modem receiver whereby to carry out a self-handshake procedure; and
 conveying the fax or modem signals received by the radio receiver to the fax or modem receiver.

14. Interface for enabling a fax machine to receive broadcasted fax signals, comprising:
 means for monitoring and analyzing the signals conveyed by the radio receiver to said interface;
 means for activating the fax or modem receiver if said signals constitute a predetermined ring code;
 means for causing the fax receiver to produce the signals normally produced by it when acting as a called machine;
 means for intercepting said call machine handshake signals without broadcasting them;
 means for producing, in response to said intercepted signals, the response handshake signals that would normally be produced by the calling machine and for backfeeding them to the fax or modem receiver, whereby to carry out a self-handshake procedure; and
 means for transmitting the fax or modem message to the fax or modem receiver once the said self-handshake procedure has been completed.

15. A system for broadcasting and receiving information, comprising:
 means for broadcasting information, said broadcasting means comprising:
 means for producing first signals from a group of signals including fax and modem signals; and
 means for broadcasting said first signals;
 means for receiving broadcasted information, said receiving means comprising:
 a radio receiver for receiving said broadcasted first signals;
 means for decoding said broadcasted first signals; and
 an interface connected between said radio receiver and said decoding means, said interface comprising control means for monitoring and analyzing the signals conveyed by the radio receiver to said interface, for activating the decoding means if said signals constitute a predetermined ring code, for causing it to produce the signals normally produced by it when acting as a called machine once this latter has been activated, for intercepting said call machine handshake signals without broadcasting them, for producing, in response to said intercepted signals, the response handshake signals that would normally be produced by the calling machine and backfeeding them to the fax or modem receiver, whereby to carry out a self-handshake procedure; and for transmitting the message to the decoding means once the said self-handshake procedure has been completed.

* * * * *

UNITED STATES PATENT AND TRADEMARK OFFICE
CERTIFICATE OF CORRECTION

PATENT NO. : 5,299,024

DATED : March 29, 1994

INVENTOR(S) : Kafri

It is certified that error appears in the above-identified patent and that said Letters Patent is hereby corrected as shown below:

On the title page;
Insert --[30] Foreign Application Priority Data
Mar. 25, 1991   Israel ...................97671-- after the words "[22] Filed:   Mar. 19, 1992".

In column 3, line 7, delete "3ccordingly" and insert --accordingly--.

Signed and Sealed this

Twenty-third Day of August, 1994

Attest:

BRUCE LEHMAN

*Attesting Officer*          *Commissioner of Patents and Trademarks*